No. 755,452. PATENTED MAR. 22, 1904.
W. VON CHELMICKI.
DEVICE FOR UNLOADING AND DISTRIBUTING EARTH,
MANURE, &c., FROM WAGONS.
APPLICATION FILED MAR. 24, 1903.
NO MODEL.
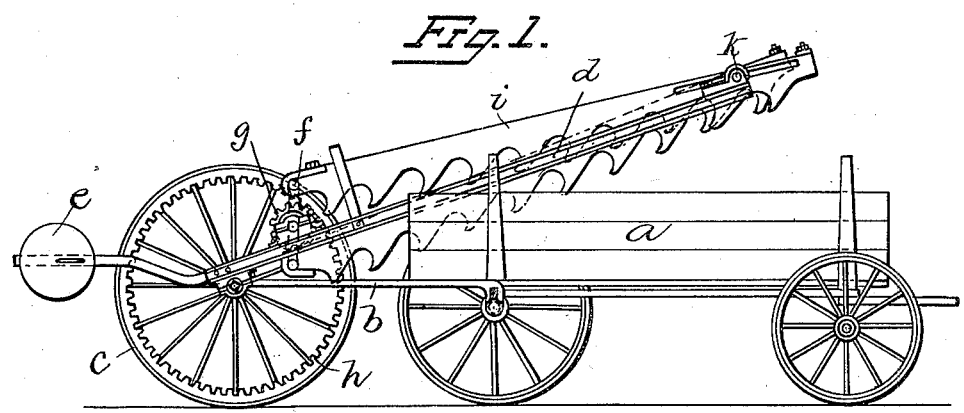
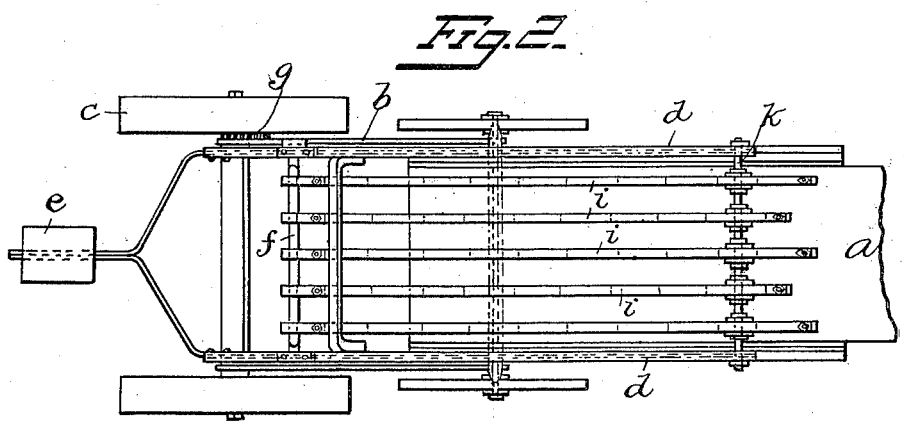
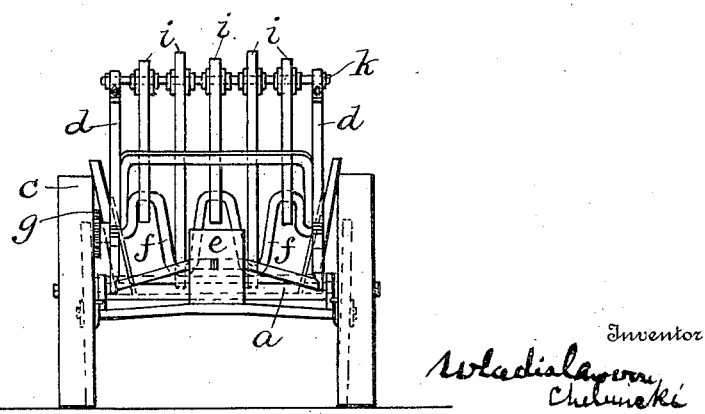

No. 755,452.                                                                       Patented March 22, 1904.

UNITED STATES PATENT OFFICE.

WLADISLAW VON CHELMICKI, OF ZYDOWO, GERMANY.

DEVICE FOR UNLOADING AND DISTRIBUTING EARTH, MANURE, &c., FROM WAGONS.

SPECIFICATION forming part of Letters Patent No. 755,452, dated March 22, 1904.

Application filed March 24, 1903. Serial No. 149,314. (No model.)

*To all whom it may concern:*

Be it known that I, WLADISLAW VON CHELMICKI, a subject of the King of Prussia, German Emperor, residing at Zydowo, Bromberg, in the Kingdom of Prussia and Empire of Germany, have invented a new and useful Device for Unloading and Distributing Earth, Manure, and the Like from Wagons, of which the following is a specification.

My invention relates to a device for unloading and distributing heavy materials—such as earth, gravel, sand, compost, manure, and the like—from wagons. This device, arranged to run on wheels and to be coupled to the wagon, is furnished with bars somewhat resembling saw-blades and which being moved similarly to a straw-shaker will draw the earth, manure, or the like from the wagon.

In the accompanying drawings I have shown a constructional form of the improved device, Figure 1 being a side elevation, (two of the wheels are removed,) Fig. 2 a plan, and Fig. 3 a rear elevation, of the same.

To the wagon $a$, carrying the material to be distributed, is coupled by rods $b$ a frame $d$, which runs on its own wheels $c$ and carries the arrangements for drawing the material from the said wagon. By their hook-shaped front ends the said rods $b$ engage with the rear axle of the wagon by the side of the supports or stakes, whereby the body of the wagon is held. The weight of the frame $d$ is balanced by a counterweight $e$, such frame being capable of swinging about the axle of the wheels $c$.

In bearings upon the frame $d$ is held a crank-shaft $f$, which carries at one end a toothed wheel $g$, gearing with an internally-toothed crown $h$, attached to one of the wheels $c$, so that when these wheels run upon the ground the crank-shaft $f$ will be turned. This shaft $f$ has a plurality of cranks arranged at angles of one hundred and eighty degrees relatively to each other. Each crank is in connection with a bar $i$, resembling a saw-blade, and furnished at its under side with gripping-teeth $j$. By this means motion is imparted to the bars $i$ similarly to a straw-shaker in such a manner that in the lower portion of the turning movement of the said cranks the bars will by their teeth draw the material down from the wagon-body $a$, while when the cranks are in their highest position the said bars will be raised, with their teeth $j$, out of the material on the wagon and moved forward again. The bars $i$ are slotted in their front parts in order to be guided upon a rod $k$, which traverses them and forms part of the frame $d$. When the material to be distributed has been removed from the wagon, the frame after the disconnection of the rods $b$ is moved a quarter of a turn to one side, so that a fresh-loaded wagon may be put in the place of the empty one, whereupon the frame is moved close to a fresh wagon and after a quarter of a turn is connected by its rods $b$ to such wagon. Thus the distribution may be continued exactly at the point where the preceding wagon had left off.

What I claim as my invention, and desire to secure by Letters Patent, is—

1. A device of the character described, comprising an axle, wheels carrying the same, a frame supported upon such axle, a crank-shaft held in the frame and having a plurality of cranks, and bars formed with teeth and connected to the said cranks, substantially as and for the purpose set forth.

2. A device of the character described, comprising an axle, wheels carrying the same, an internally-toothed crown attached to one of these wheels, a frame supported upon the axle, a counterweight adapted to balance the frame upon such axle, a crank-shaft having a plurality of cranks arranged at angles of one hundred and eighty degrees relatively to each other, a toothed wheel mounted on the crank-shaft and gearing with the said toothed crown, and bars formed with teeth and connected to the said cranks, substantially as and for the purpose set forth.

In testimony whereof I have signed my name to this specification in the presence of two subscribing witnesses.

WLADISLAW VON CHELMICKI.

Witnesses:
 HENRY HASPER,
 WOLDEMAR HAUPT.